US012618329B2

(12) United States Patent
Ramakrishnan et al.

(10) Patent No.: US 12,618,329 B2
(45) Date of Patent: May 5, 2026

(54) UNDUCTED AIRFOIL ASSEMBLY

(71) Applicant: General Electric Company, Schenectady, NY (US)

(72) Inventors: Kishore Ramakrishnan, Rexford, NY (US); Daniel Lawrence Tweedt, West Chester, OH (US); Valeria Andreoli, Watertown, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/192,859

(22) Filed: Mar. 30, 2023

(65) Prior Publication Data

US 2024/0328320 A1 Oct. 3, 2024

(51) Int. Cl.

| | |
|---|---|
| ***F01D 5/14*** | (2006.01) |
| ***F01D 9/02*** | (2006.01) |
| ***F01D 9/04*** | (2006.01) |
| ***F04D 29/54*** | (2006.01) |

(52) U.S. Cl.

CPC .......... *F01D 5/14* (2013.01); *F05D 2220/323* (2013.01)

(58) Field of Classification Search

CPC .......... F01D 5/141; F01D 5/145; F01D 5/147; F01D 5/282; F01D 9/041; F01D 5/16; F01D 5/30; F01D 17/16; F01D 21/045; F01D 5/14; F01D 5/3007; F01D 9/02; F01D 5/02; F01D 5/148; F01D 5/34; F04D 29/324; F04D 29/384; F04D 29/325; F04D 29/386; F04D 29/388; F04D 29/681; F04D 29/164; F04D 29/544; F04D 19/002; F05D 2220/36; F05D 2240/303; F05D 2250/70; F05D 2240/301; F05D 2300/603; F05D 2250/184; F05D 2240/121; F05D 2240/304; F05D 2220/323; F05D 2220/324; F05D 2220/325; F05D 2240/307; F05D 2250/611; F05D 2250/71; F05D 2250/711; F05D 2260/96; F05D 2230/50; F05D 2240/122; F05D 2240/305; F05D 2240/302; F05D 2240/306; F05D 2240/124; F05D 2240/123; F05B 2240/12

See application file for complete search history.

(56) References Cited

U.S. PATENT DOCUMENTS

| | | | | |
|---|---|---|---|---|
| 4,012,172 | A * | 3/1977 | Schwaar | F04D 29/324 416/223 R |
| 4,370,097 | A | 1/1983 | Hanson et al. | |
| 4,971,641 | A | 11/1990 | Nelson et al. | |
| 5,102,302 | A | 4/1992 | Schilling et al. | |
| 6,358,003 | B2 | 3/2002 | Schlechtriem | |
| 7,476,086 | B2 * | 1/2009 | Wadia | F01D 5/141 416/223 R |
| 8,083,487 | B2 | 12/2011 | Wood et al. | |

(Continued)

OTHER PUBLICATIONS

Co-Pending U.S. Appl. No. 17/994,549, filed Nov. 28, 2022.

(Continued)

*Primary Examiner* — Eric J Zamora Alvarez
(74) *Attorney, Agent, or Firm* — Dority & Manning, P.A.

(57) ABSTRACT

An unducted airfoil assembly includes an airfoil defining a leading edge, a trailing edge, a root, and a tip. A forward-most axial point of the leading edge is radially located at or greater than sixty percent of a tip radius of the airfoil when the airfoil is oriented at a design orientation for subsonic cruise operation.

12 Claims, 7 Drawing Sheets

(56) References Cited

U.S. PATENT DOCUMENTS

| | | | |
|---|---|---|---|
| 8,944,774 | B2 | 2/2015 | Bielek |
| 9,249,666 | B2 | 2/2016 | Wood et al. |
| 9,340,277 | B2 | 5/2016 | Breeze-Stringfellow et al. |
| 9,347,323 | B2 * | 5/2016 | Gallagher ............. F04D 29/325 |
| 9,593,582 | B2 * | 3/2017 | Dejeu ....................... F01D 5/14 |
| 9,630,704 | B2 | 4/2017 | Vion et al. |
| 9,776,707 | B2 | 10/2017 | Louet et al. |
| 10,113,431 | B2 | 10/2018 | Namgoong |
| 10,202,865 | B2 | 2/2019 | Breeze-Stringfellow et al. |
| 10,316,669 | B2 | 6/2019 | Romero et al. |
| 10,358,938 | B2 | 7/2019 | Romano et al. |
| 10,370,086 | B2 | 8/2019 | Vion et al. |
| 10,465,520 | B2 | 11/2019 | Vandeputte |
| 10,837,286 | B2 | 11/2020 | Jain et al. |
| 11,168,567 | B2 | 11/2021 | Gondre et al. |
| 11,203,935 | B2 | 12/2021 | Hiernaux |
| 11,371,357 | B2 | 6/2022 | De Gaillard et al. |
| 2018/0010613 | A1 * | 1/2018 | Martin .................. F04D 29/325 |
| 2019/0048724 | A1 * | 2/2019 | Tweedt ................... F01D 5/141 |
| 2022/0065118 | A1 | 3/2022 | Kray et al. |
| 2022/0268159 | A1 | 8/2022 | Postec et al. |
| 2023/0076976 | A1 * | 3/2023 | Ostdiek ................... F02K 3/077 |

OTHER PUBLICATIONS

Groeneweg et al., Advanced Propeller Research, N88-15806, NASA Technical Reports Server, pp. 5-123 to 5-152. Retrieved Dec. 1, 2022 from Webpage https://core.ac.uk/reader/42833770.

Tangopaso, A400M Propeller (Hamilton-Sundstrand) Retrieved Mar. 29, 2023 from weblink https://commons.wikimedia.org/wiki/File:A400M_Propeller_%28Hamilton-Substrand%29.jpg.

Ziemianski et al., NASA/Industry Advanced Turboprop Technology Program, ICAS-88-0.6, 14 Pages. Retrieved Dec. 1, 2022 from Webpage https://www.icas.org/ICAS_ARCHIVE/ICAS1988/ICAS-88-0.6.

* cited by examiner

UNDUCTED AIRFOIL ASSEMBLY

FEDERALLY SPONSORED RESEARCH

This invention was made with government support under contract number 693KA9-21-T-00003 awarded by the Federal Aviation Administration. The U.S. government may have certain rights in the invention.

FIELD

The present subject matter relates generally to components of a gas turbine engine, or more particularly to an unducted airfoil assembly.

BACKGROUND

A gas turbine engine generally includes a fan and a turbomachine arranged in flow communication with one another. Additionally, the turbomachine of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The fan is driven by the turbomachine. The fan includes a plurality of circumferentially spaced fan blades extending radially outward from a rotor disk. Rotation of the fan blades creates an airflow through the inlet to the compressor section of the turbomachine, as well as an airflow over the turbomachine.

BRIEF DESCRIPTION OF THE DRAWINGS

A full and enabling disclosure of the presently described technology, including the best mode thereof, directed to one of ordinary skill in the art, is set forth in the specification, which makes reference to the appended figures, in which.

Figure 1:
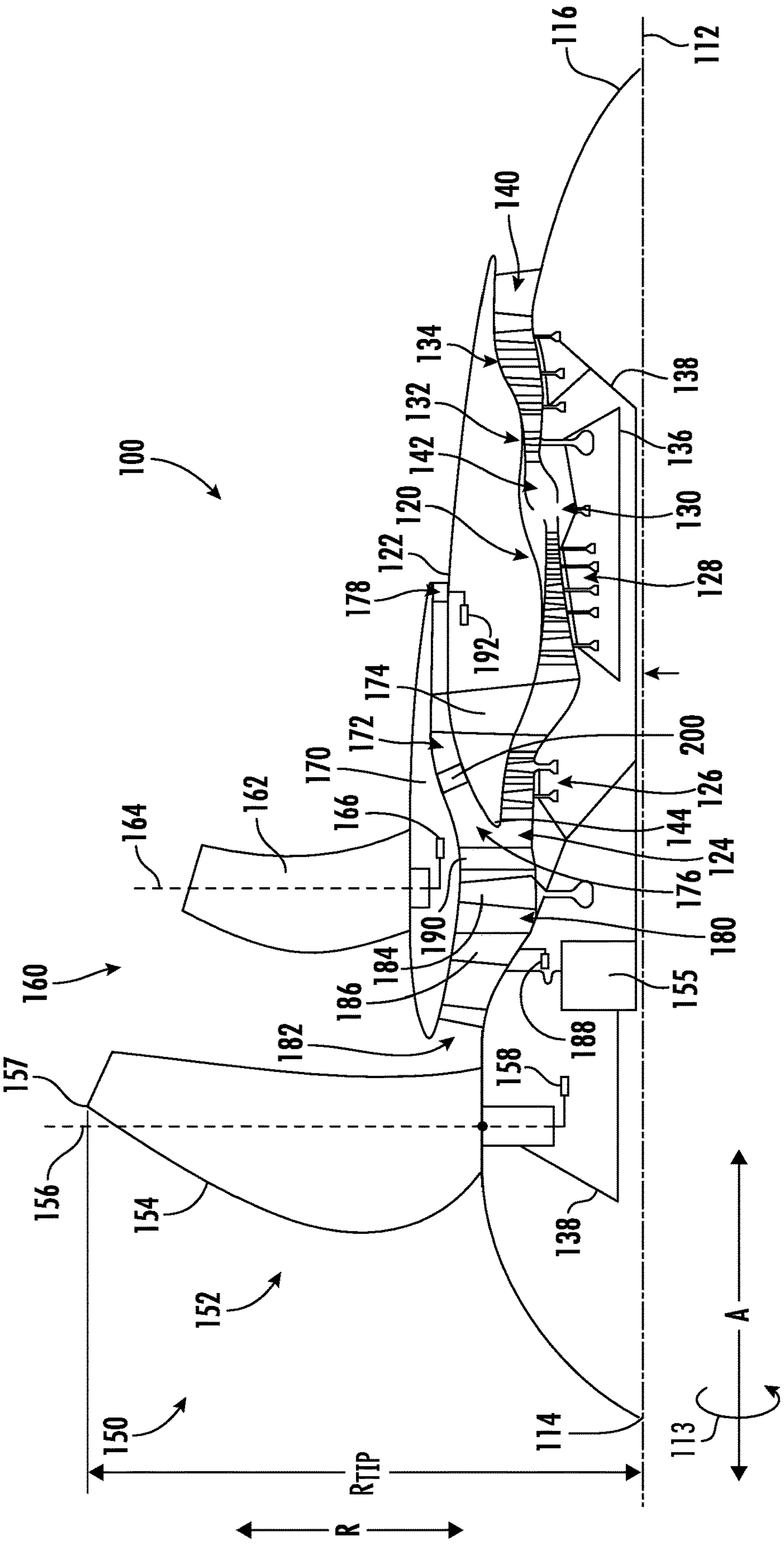
FIG. 1 is a schematic, cross-sectional view of an exemplary, unducted gas turbine engine according to various embodiments of the present subject disclosure.

Repeat use of reference characters in the present specification and drawings is intended to represent the same or analogous features or elements of the present subject matter.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" may be used interchangeably to distinguish one component from another and are not intended to signify location or importance of the individual components.

The terms "forward" and "aft" refer to relative positions within a turbomachine, gas turbine engine, or vehicle and refer to the normal operational attitude of the same. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled", "fixed", "attached to", and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

In certain aspects of the present disclosure, an unducted airfoil assembly is provided. The unducted airfoil assembly generally includes circumferentially spaced airfoils or blades. The blade defines a leading edge and a trailing edge, and further defining a root and a tip extending radially to define a span of the airfoil. In some embodiments, a forward-most axial point of the leading edge is located at or greater than sixty percent of a tip radius of the airfoil. In some embodiments, a maximum chord extending from the leading edge to the trailing edge is located at or greater than sixty percent of the tip radius. Embodiments of the present disclosure increase the sweep and dihedral of the blade near the tip of the blade to reduce noise radiated by the blade. Embodiments of the present disclosure reduce noise at cruise and landing and takeoff (LTO) flight conditions while minimizing weight and mechanical complexity by localizing sweep in the acoustically sensitive portions of the blade by tailoring the chord and axial position of the leading edge of the blade. Additionally, a maximum thickness of the blade is moved closer to the leading edge in the acoustically sensitive portions of the blade.

Referring now to FIG. 1, a schematic cross-sectional view of a gas turbine engine 100 is provided according to an example embodiment of the present disclosure. Particularly, FIG. 1 provides a turbofan engine 100 having a rotor assembly with a single stage of unducted rotor blades. In such a manner, the rotor assembly may be referred to herein as an "unducted fan," or the entire gas turbine engine 100 may be referred to as an "unducted turbofan engine." In addition, the gas turbine engine 100 of FIG. 1 includes a third stream extending from the compressor section to a rotor assembly flowpath over the turbomachine, as will be explained in more detail below.

For reference, the gas turbine engine 100 defines an axial direction A, a radial direction R, and a circumferential direction 113. Moreover, the gas turbine engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction 113 extends three hundred sixty degrees (360°) around the longitudinal axis 112. The gas turbine engine 100 extends between a forward end 114 and an aft end 116, e.g., along the axial direction A.

The gas turbine engine 100 includes a turbomachine 120 and a rotor assembly, also referred to as a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the gas turbine engine 100 may be referred to as an open rotor engine.

As depicted, the fan 152 includes an array of airfoils arranged around the longitudinal axis 112 of engine 100, and more particularly includes an array of fan blades 154 (only one shown in FIG. 1) arranged around the longitudinal axis 112 of engine 100. The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a proximal end or root and a distal end or tip and a span defined therebetween. For descriptive purposes, reference will be made to a "tip radius", referred to as $R_{tip}$, of the fan blade 154. The tip radius $R_{tip}$ is the radial distance from the longitudinal axis 112 to the outermost radial coordinate of the fan blade 154, typically at the leading edge of the fan blade 154 and typically referred to as a tip leading edge 157. A point located at the tip leading edge 157 would be referred to as 100% of tip radius $R_{tip}$, and a point at the longitudinal axis 112 would be referred to as 0% of tip radius $R_{tip}$. Thus, a location on the fan blade 154 may be defined in terms of $R/R_{tip}$ (e.g., a point at the tip leading edge 157 would be defined as 1.0 $R/R_{tip}$ and a point at the longitudinal axis 112 would be defined as 0.0 $R/R_{tip}$). Each fan blade 154 defines a pitch change or central blade axis 156. For this embodiment, each fan blade 154 of the fan 152 is pitchable about its central blade axis 156, e.g., in unison with one another. One or more actuators 158 are provided to facilitate such rotation and therefore may be used to change a pitch of the fan blades 154 about their respective central blade axes 156.

The fan section 150 further includes an array of airfoils positioned aft of the fan blades 154 and also disposed around longitudinal axis 112, and more particularly includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a proximal end or root and a distal end or tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the gas turbine engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a proximal end or root and a distal end or tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The gas turbine engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or the leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of a third stream thrust, Fn3S (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the gas turbine engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Figure 2:
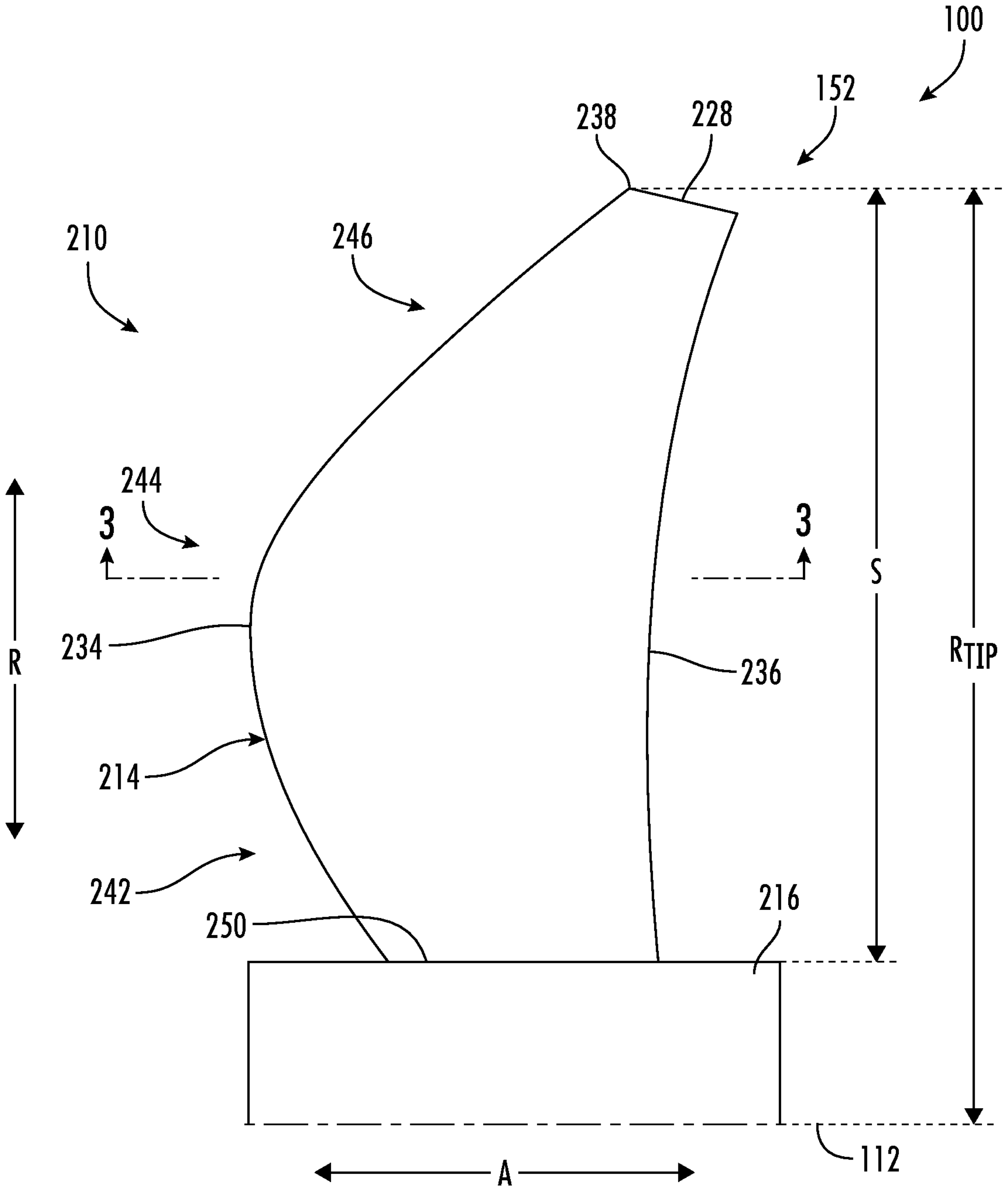
FIG. 2 is a schematic view of an exemplary airfoil according to various embodiments of the present disclosure.
Figure 3:
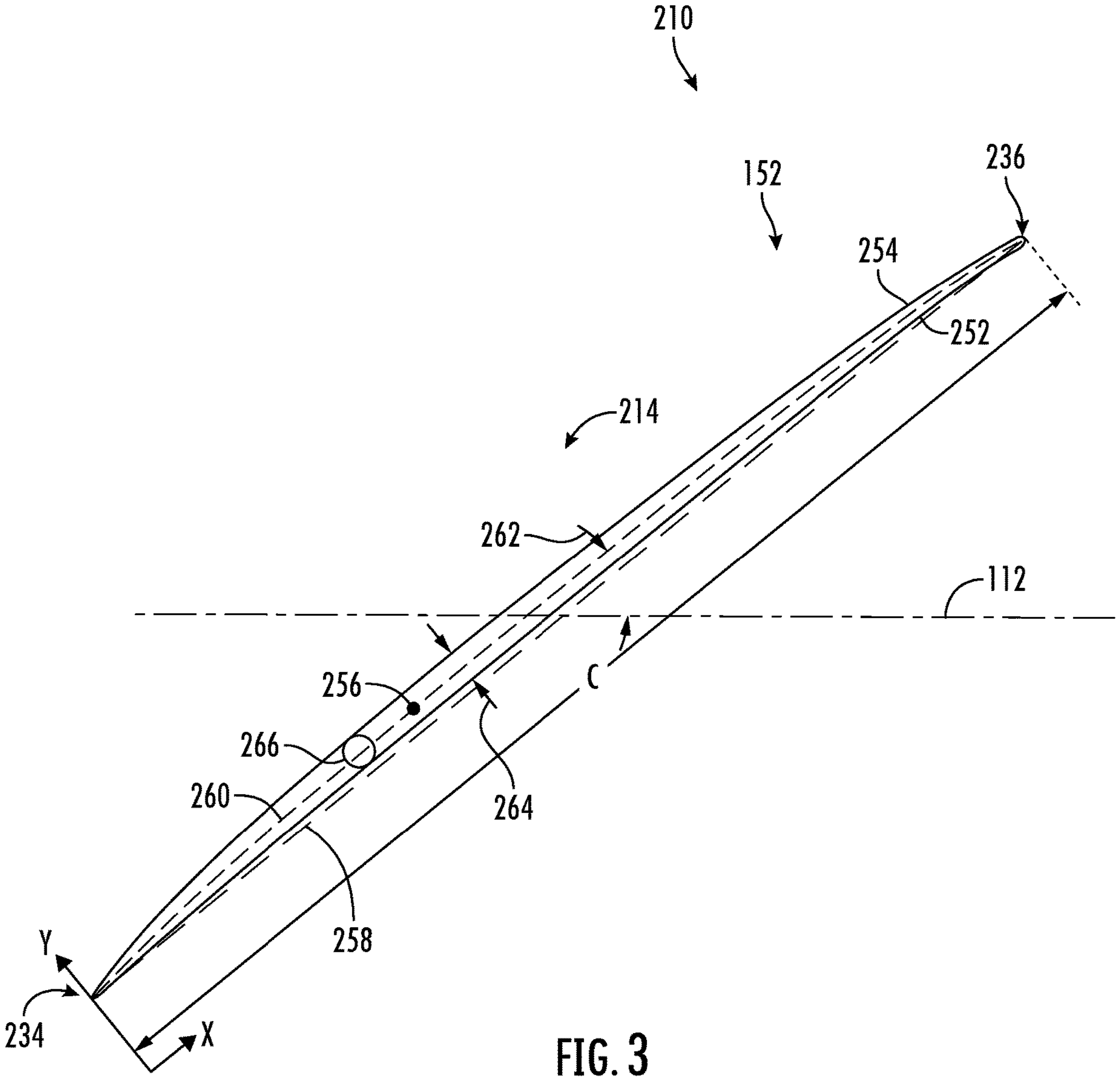
FIG. 3 is a schematic sectional view taken along line 3-3 of FIG. 2 in accordance with various embodiments of the present disclosure.

Referring now to FIGS. 2 and 3, FIG. 2 is a schematic view of an exemplary unducted airfoil assembly 210 in accordance with various embodiments of the present disclosure, and FIG. 3 is a schematic sectional view taken along line 3-3 of FIG. 2 in accordance with various embodiments of the present disclosure. The exemplary unducted airfoil assembly 210 may be configured for use as the fan 152 or the fan guide vane array 160 (FIG. 1). The unducted airfoil assembly 210 includes an array of airfoils or blades 214 (only one shown in FIG. 2) that are regularly spaced apart circumferentially around a disk or hub 216 of a rotor centered on the longitudinal axis 112 of the fan 152 (FIG. 1). Each blade 214 includes a leading edge 234, a trailing edge 236, a root or proximal end 250 (i.e., an inboard end in the radial direction R toward the longitudinal axis 112 (FIG. 1)), and a tip 228. Also, a tip leading edge 238 of the blade 214 is defined as an intersection of the leading edge 234 with the tip 228. Each blade 214 extends radially outward along a span "S" from the root or proximal end 250 to the tip 228. For descriptive purposes, and as described above, reference will also be made to a "tip radius", referred to as $R_{tip}$, of the blade 214. The tip radius $R_{tip}$ is the radial distance from the longitudinal axis 112 to the outermost radial coordinate (typically the tip leading edge 238) of the blade 214. A point located at the tip leading edge 238 would be referred to as 100% of tip radius $R_{tip}$ (or 1.0 $R/R_{tip}$), and a point at the longitudinal axis 112 would be referred to as 0% of tip radius $R_{tip}$ (or 0.0 $R/R_{tip}$).

Blade 214 forms an aerodynamic surface extending along the axial direction A between the leading edge 234 and the trailing edge 236. The blade 214 extends outward from the proximal end 250 in the radial direction R. In the illustrated embodiment, the leading edge 234 includes an inboard portion 242 that extends outward in the radial direction R to a particular span or $R/R_{tip}$ location, a medial portion 244 that extends from the inboard portion 242 toward the tip leading edge 238, and a tip portion 246 that extends radially from an outboard location of the medial portion 244 to the tip leading edge 238 and encompasses the tip leading edge 238 and the tip 228. As used herein, a "tip portion" of a blade is defined as a portion of the blade extending radially from a radial location of a forward-most axial point of the leading edge of the blade to a radial location of the tip leading edge of the blade when the blade is at its design orientation (e.g., at an orientation representative of subsonic cruise flight speed or operation). For example, cruise is a phase of the flight that occurs when an aircraft levels to a set altitude after a climb and before it begins to descend. Thus, as used herein, cruise represents a continuous, high speed, and stable condition of flight for which an aircraft is intended to operate. This description is to distinguish cruise from certain conditions that are abnormal or transient, such as dive, in which the aircraft can reach high flight speeds, but the aircraft is not intended to experience for a substantial portion of the mission from takeoff to landing. Thus, a subsonic cruise flight speed may refer to subsonic operation at a flight Mach number at or above 0.4, or at or above 0.5. Thus, in the illustrated embodiment, the tip portion 246 of the blade 214 is defined as a portion of the blade 214 extending radially from a radial location of a forward-most axial point of the leading edge 234 of the blade 214 to a radial location of the tip leading edge 238 of the blade 214 when the blade 214 is at its design orientation (e.g., at an orientation representative of subsonic cruise flight speed or operation). In the illustrated embodiment, the leading edge 234 of the inboard portion 242 sweeps forward in the axial direction A, and the leading edge 234 of the medial portion 244 begins sweeping aft in the axial direction A outboard of the inboard portion 242. An acoustically active portion or span of the blade 214 may be determined, for example, via a relationship between an acoustic source strength distributed radially along the blade 214 and a radiation efficiency along the blade 214. The acoustically active portion of the blade 214 may be determined by multiplying an acoustic source strength distributed radially along the blade 214 by an acoustic Green's function or radiation efficiency (e.g., the ability of noise sources to propagate acoustic energy to surrounding media) along the blade 214. The radiation efficiency may be any known relation describing the effective strength of a noise source on the airfoil, fan or propeller blade to an observer location of interest, and may be dependent on the airfoil shape, size, flow conditions, combinations thereof, or the like. In some exemplary embodiments, the trailing edge 236 of the blade 214 is configured having a smooth, curved profile (e.g., without steps or abrupt axial sweep changes/transitions).

Each blade 214 extends from the root or proximal end 250 at the hub 216 to the tip leading edge 238 and includes a generally concave pressure side 252 joined to a generally convex suction side 254 at the leading edge 234 and the trailing edge 236. The blade 214 may be represented as an array or "stack" of individual airfoil sections arrayed along a spanwise stacking line 256 (e.g., in-and-out of the page as depicted in FIG. 3). For each individual airfoil section of the blade 214, an imaginary straight line referred to as a "chord line" 258 connects the leading edge 234 and the trailing edge 236. Also, for each individual airfoil section of the blade 214, a curve called the "mean camber line" or "meanline" 260 represents the locus of points lying halfway between the concave pressure side 252 and the convex suction side 254. Typically, the blade 214 would incorporate "twist", a feature in which the stacked airfoil sections are rotated relative to each other about the spanwise stacking line 256. Although not shown in the illustrated example, it will be understood that the blade 214 may incorporate "lean", a shift in the circumferential direction 113 (FIG. 1), and "axial sweep", a shift in the axial direction A.

As indicated above, each blade 214 extends radially outward along the span "S" from the root 250 to the tip 228, and a chord (or chord dimension) "C" defined as the length of the chord line 258. The chord dimension may be constant over the span S, or it may vary over the span S, as shown. An airfoil section of the blade 214 has a meanline angle 262, which refers to the angle between the tangent to the meanline 260 and the longitudinal axis 112. The meanline angle 262 can be measured at any location along the meanline 260. The value of the meanline angle 262 is a function of both the curvature of the meanline 260 and the pitch angle of the blade 214 at a reference condition, usually the cruise phase/operation orientation or position. It will therefore be understood that the overall meanline shape characteristic is unchanging and depends solely on the curvature of the blade 214.

The blade 214 has a thickness 264 which is a distance measured normal to the meanline 260 between the concave pressure side 252 and the convex suction side 254, which can be measured at any location along the meanline 260. In accordance with conventional practice, a thickness ratio is computed as the absolute value of the thickness divided by the length of the chord C, expressed as a percentage.

A location along the meanline 260 of either the meanline angle 262 or the thickness 264 may be described using a chord fraction, the value of which may be expressed as a percentage. As used herein, chord fraction refers to a chordwise distance of the location from leading edge 234 to a point of interest divided by the chord C. So, for example, the leading edge 234 is located at 0% of the chord, and the trailing edge 236 is located at 100% of the chord C. A maximum thickness of the airfoil section of the blade 214 at a particular chordwise location is represented by the diameter of an inscribed circle 266 between the concave pressure side 252 and the convex suction side 254 along that particular chord.

Figure 4A:
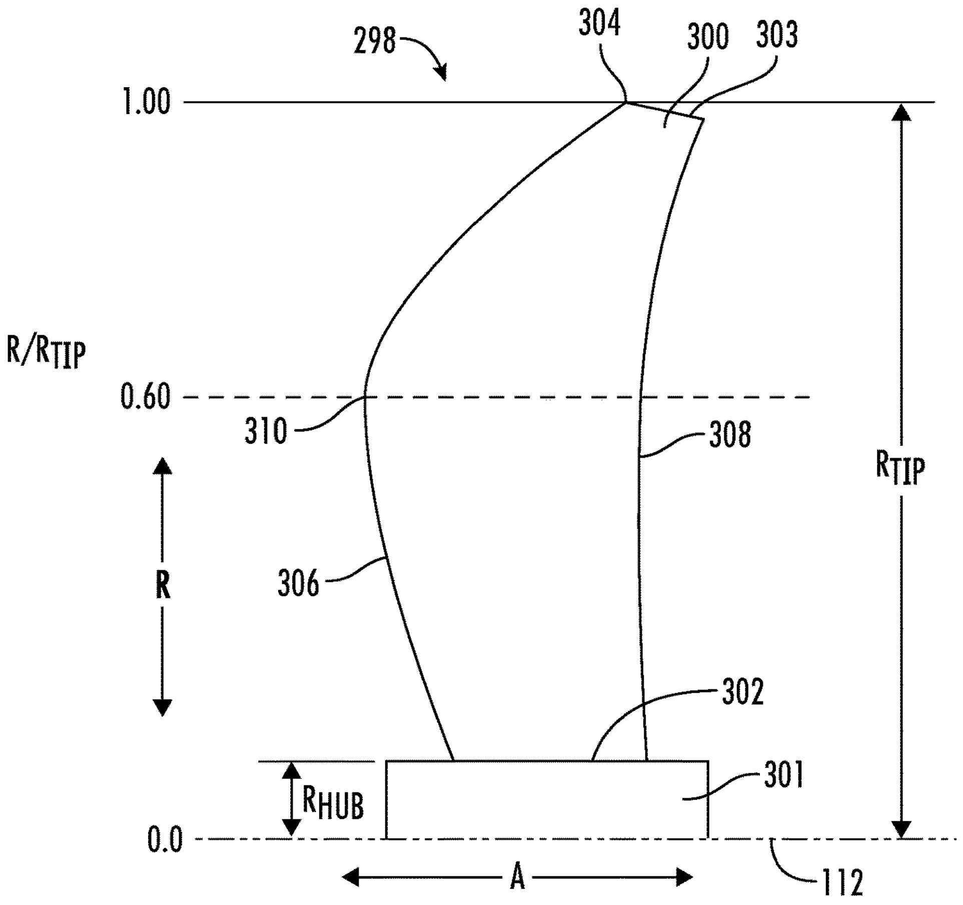
FIG. 4A is a schematic view of an exemplary airfoil according to another embodiment of the present disclosure.
Figure 4B:
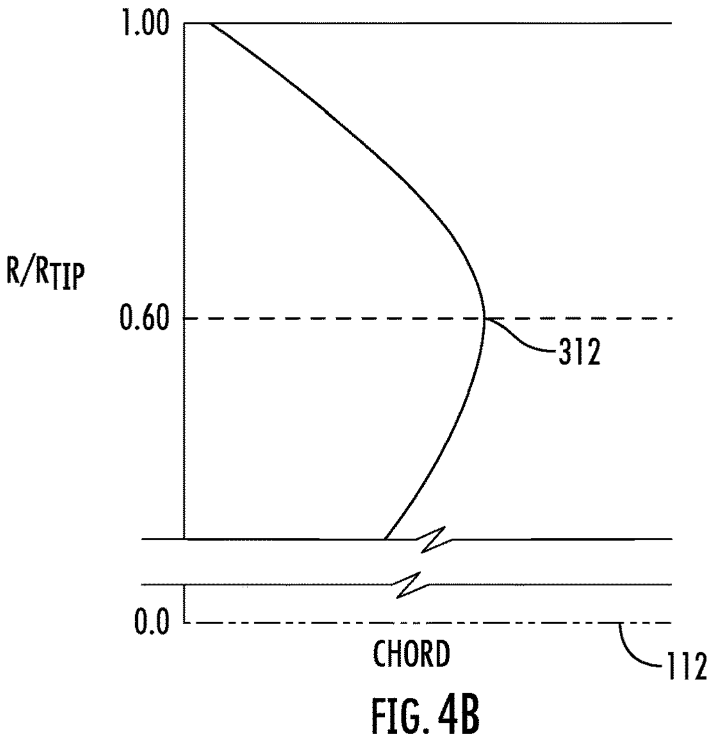
FIG. 4B is a graph plotting a chord length of a chord as a function of a radial location of the chord, expressed as a fraction of a tip radius of the airfoil, of the exemplary airfoil of FIG. 4A according to an embodiment of the present disclosure.

Referring to FIGS. 4A and 4B, FIG. 4A is a schematic view of an exemplary airfoil or blade 300 of an unducted airfoil assembly 298 according to an embodiment of the present disclosure, and FIG. 4B is a graph plotting a chord length of a chord as a function of a location of the chord of the blade 300 of FIG. 4A according to an embodiment of the present disclosure. In some embodiments, the blade 300 may be configured similarly to the blade 214 (FIGS. 2 and 3). In FIGS. 4A and 4B, radial locations of certain features are expressed as a fraction of a tip radius $R_{tip}$ of the blade 300, or as an $R/R_{tip}$ value. The blade 300 may be configured for use as the fan 152 or the fan guide vane array 160 (FIG. 1).

An array or plurality of the blades 300 (only one shown in FIG. 4A) may be regularly spaced apart circumferentially around a disk or hub 301 of a rotor centered on the longitudinal axis 112 of the fan 152 (FIG. 1). Each blade 300 includes a leading edge 306, a trailing edge 308, a root or proximal end 302 (i.e., an inboard end in the radial direction R toward the longitudinal axis 112 (FIG. 1)) and a tip 303. Also, a tip leading edge 304 of the blade 300 is defined as an intersection of the leading edge 306 with the tip 303. Each blade 300 extends radially outward along a span from the root 302 to the tip 303. In different embodiments, different hub radius ratios may be used. For example, each blade 300 defines a tip radius $R_{tip}$ along the radial direction R from the longitudinal axis 112 to the outermost radial coordinate of the blade 300 (typically at the tip leading edge 304), and a hub radius $R_{hub}$ along the radial direction R from the longitudinal axis 112 to the outer radius of the hub 301 defined at the leading edge 306 of the blade 300. The hub radius ratio is typically the hub radius $R_{hub}$ divided by the tip radius $R_{tip}$. As an example, for an exemplary embodiment where an outer radius of the hub 301, or hub radius $R_{hub}$, (centered on the longitudinal axis 112 (FIG. 1) of the fan 152 (FIG. 1)) is located radially at approximately thirty percent (30%) of the tip radius $R_{tip}$, a value of 0.3 $R/R_{tip}$ corresponds to a zero percent (0%) span location. As indicated above, an $R/R_{tip}$ value of 0.0 corresponds to the longitudinal axis 112. Thus, it should be understood that different hub radius ratios used in connection with the blade 300 may result in different span coordinate values for different $R/R_{tip}$ coordinate values corresponding to various features of the blade 300 according to the present disclosure.

Blade 300 forms an aerodynamic surface extending along the axial direction A between the leading edge 306 and the trailing edge 308. FIG. 4A depicts an axial profile (e.g., axial coordinates of the blade 300 expressed as a function of $R/R_{tip}$ of the blade 300). Thus, a forward axial direction relative to the blade 300 is right-to-left in FIG. 4A, and an aft axial direction relative to the blade 300 is left-to-right in FIG. 4A. The blade 300 extends outward from the proximal end 302 in the radial direction R.

In the illustrated embodiment, the blade 300 is configured such that a furthest forward or forward-most axial point 310 of the leading edge 306 at its design orientation (e.g., at an orientation representative of subsonic cruise operation) is defined or radially located at or greater than sixty percent (60%) of the tip radius $R_{tip}$ of the blade 300 (or 0.60 $R/R_{tip}$). Additionally, a maximum chord 312 (i.e., a maximum length of a chord of the blade 300 extending from the leading edge 306 to the trailing edge 308) for the blade 300 is defined or radially located at or greater than sixty percent (60%) of the tip radius $R_{tip}$ of the blade 300 (or 0.60 $R/R_{tip}$).

Figure 5A:
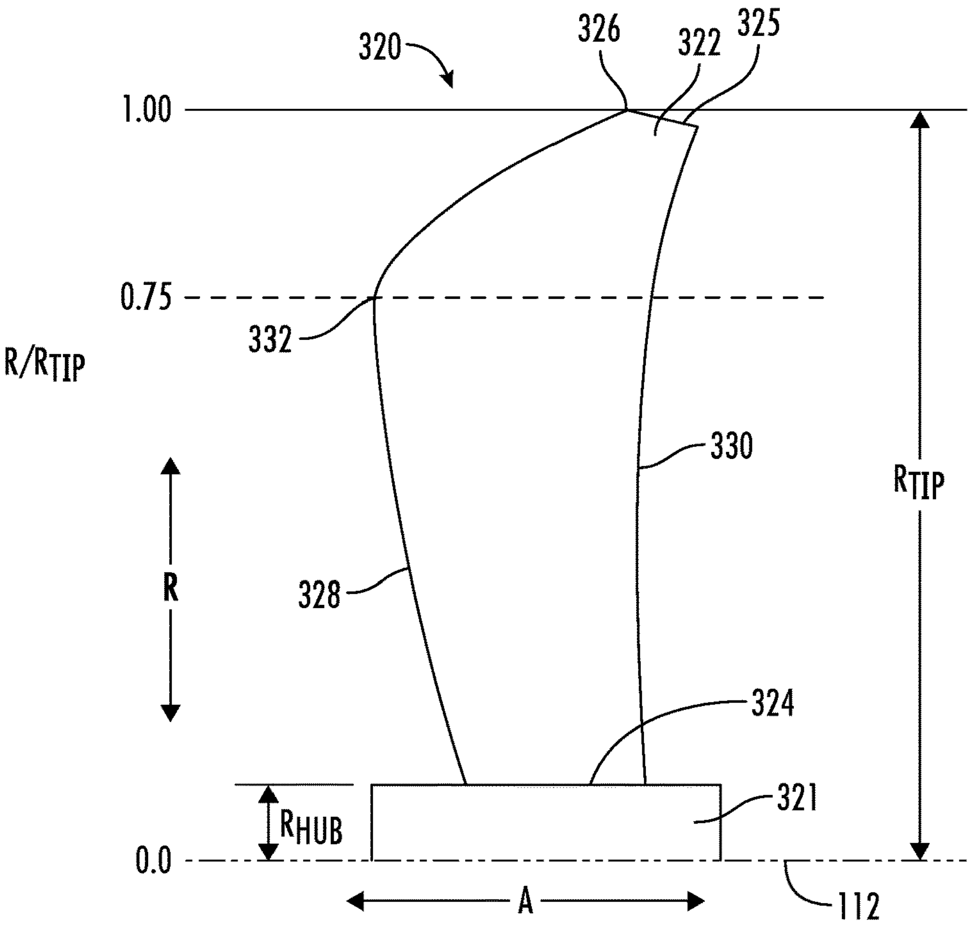
FIG. 5A is a schematic view of an exemplary airfoil according to another embodiment of the present disclosure.
Figure 5B:
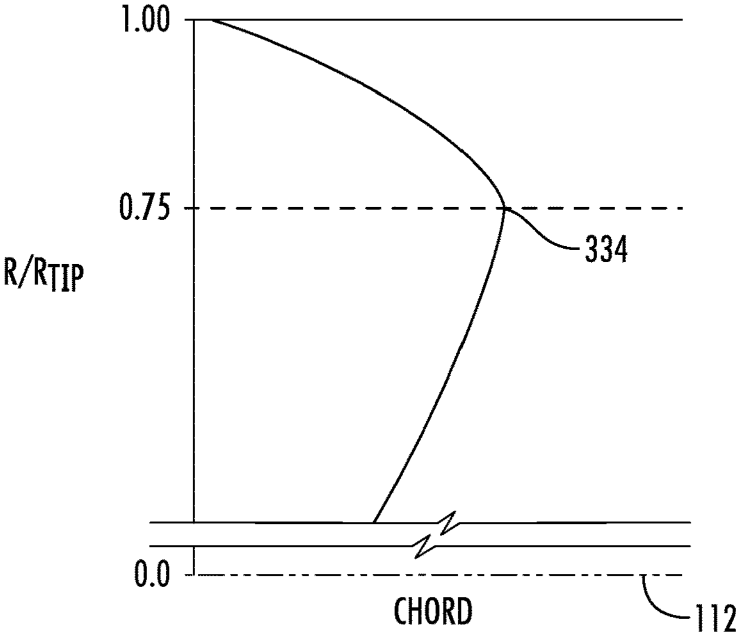
FIG. 5B is a graph plotting a chord length of a chord as a function of a radial location of the chord, expressed as a fraction of a tip radius of the airfoil, of the exemplary airfoil of FIG. 5A according to an embodiment of the present disclosure.

Referring to FIGS. 5A and 5B, FIG. 5A is a schematic view of an exemplary airfoil or blade 322 of an unducted airfoil assembly 320 according to an embodiment of the present disclosure, and FIG. 5B is a graph plotting a chord length of a chord as a function of a location of the chord of the blade 322 of FIG. 5A according to an embodiment of the present disclosure. In some embodiments, the blade 322 may be configured similarly to the blade 214 (FIGS. 2 and 3) and the blade 300 (FIGS. 4A and 4B). In FIGS. 5A and 5B, radial locations of certain features are expressed as a fraction of a tip radius $R_{tip}$ of the blade 322, or as an $R/R_{tip}$ value. The blade 322 may be configured for use as the fan 152 or the fan guide vane array 160 as depicted in FIG. 1.

An array or plurality of the blades 322 (only one shown in FIG. 5A) may be regularly spaced apart circumferentially around a disk or hub 321 of a rotor centered on the longitudinal axis 112 of the fan 152 (FIG. 1). Each blade 322 includes a leading edge 328, a trailing edge 330, a root or proximal end 324 (i.e., an inboard end in the radial direction R toward the longitudinal axis 112 (FIG. 1)) and a tip 325. Also, an intersection of the leading edge 328 and the tip 325 is defined as a tip leading edge 326. Each blade 322 extends radially outward along a span from the root 324 to the tip 325. Blade 322 forms an aerodynamic surface extending along the axial direction A between the leading edge 328 and the trailing edge 330. FIG. 5A depicts an axial profile (e.g., axial coordinates of the blade 322 expressed as a function of $R/R_{tip}$ of the blade 322). Thus, a forward axial direction relative to the blade 322 is right-to-left in FIG. 5A, and an aft axial direction relative to the blade 322 is left-to-right in FIG. 5A. The blade 322 extends outward from the proximal end 324 in the radial direction R.

In the illustrated embodiment, the blade 322 is configured such that a furthest forward or forward-most axial point 332 of the leading edge 328 at its design orientation (e.g., at an orientation representative of subsonic cruise operation) is defined or radially located at or greater than seventy-five (75%) of the tip radius $R_{tip}$ of the blade 322 (or 0.75 $R/R_{tip}$). Additionally, a maximum chord 334 (i.e., a maximum length of a chord of the blade 322 extending from the leading edge 328 to the trailing edge 330) for the blade 322 is defined or radially located at or greater than seventy-five percent (75%) of the tip radius $R_{tip}$ of the blade 322 (or 0.75 $R/R_{tip}$).

Referring to FIGS. 4A-5B, in some embodiments, the blade 300/322 is configured such that a furthest forward or forward-most axial point 310/332 of the leading edge 306/328 is defined or radially located at or greater than sixty-five percent (65%) of the tip radius $R_{tip}$ of the blade 300/322 (or 0.65 $R/R_{tip}$). Additionally, in some embodiments, the maximum chord 312/334 (i.e., a maximum length of a chord of the blade 300/322 extending from the leading edge 306/326 to the trailing edge 308/330) for the blade 300/322 is defined or radially located at or greater than sixty-five percent (65%) of the tip radius $R_{tip}$ of the blade 300/322 (or 0.65 $R/R_{tip}$). In some embodiments, the blade 300/322 is configured such that a furthest forward or forward-most axial point 310/332 of the leading edge 306/328 is defined or radially located at or greater than sixty-eight percent (68%) of the tip radius $R_{tip}$ of the blade 300/322 (or 0.68 $R/R_{tip}$). Additionally, in some embodiments, the maximum chord 312/334 (i.e., a maximum length of a chord of the blade 300/322 extending from the leading edge 306/328 to the trailing edge 308/330) for the blade 300/322 is defined or radially located at or greater than sixty-eight percent (68%) of the tip radius $R_{tip}$ of the blade 300/322 (or 0.68 $R/R_{tip}$). In some embodiments, the blade 300/322 is configured such that a furthest forward or forward-most axial point 310/332 of the leading edge 306/328 is defined or radially located at or greater than seventy-two percent (72%) of the tip radius $R_{tip}$ of the blade 300/322 (or 0.72 $R/R_{tip}$). Additionally, in some embodiments, the maximum chord 312/334 (i.e., a maximum length of a chord of the blade 300/322 extending from the leading edge 306/328 to the trailing edge 308/330) for the blade 300/322 is defined or radially located at or greater than seventy-two percent (72%) of the tip radius $R_{tip}$ of the blade 300/322 (or 0.72 $R/R_{tip}$).

In some embodiments, the furthest forward or forward-most axial point 310/332 of the leading edge 306/328 and/or the maximum chord 312/334 (i.e., a maximum length of a chord of the blade 300/322 extending from the leading edge 306/328 to the trailing edge 308/330) for the blade 300/322 may be defined as a function of the span of the blade 300/322. As indicated above, depending on a particular hub radius ratio corresponding to a particular blade 300/322, the spanwise location of the furthest forward or forward-most axial point 310/332 of the leading edge 306/328 and/or the maximum chord 312/334 (i.e., a maximum length of a chord of the blade 300/322 extending from the leading edge 306/328 to the trailing edge 308/330) for the blade 300/322 may vary. For example, in some embodiments, the blade 300/322 is configured such that the furthest forward or forward-most axial point 310/332 of the leading edge 306/328 at its design orientation (e.g., at an orientation representative of subsonic cruise operation) is defined or radially located at or greater than fifty percent (50%) of the span of the blade 300/322. Additionally, the maximum chord 312/334 (i.e., a maximum length of a chord of the blade 300/322 extending from the leading edge 306/328 to the trailing edge 308/330) for the blade 300/322 is defined or radially located at or greater than fifty percent (50%) of the span of the blade 300/322. In some embodiments, the blade 300/322 is configured such that a furthest forward or forward-most axial point 310/332 of the leading edge 306/328 is defined or radially located at or greater than fifty-five percent (55%) of the span of the blade 300/322. Additionally, in some embodiments, the maximum chord 312/334 (i.e., a maximum length of a chord of the blade 300/322 extending from the leading edge 306/328 to the trailing edge 308/330) for the blade 300/322 is defined or radially located at or greater than fifty-five percent (55%) of the span of the blade 300/322. In some embodiments, the blade 300/322 is configured such that a furthest forward or forward-most axial point 310/332 of the leading edge 306/328 is defined or radially located at or greater than sixty percent (60%) of the span of the blade 300/322. Additionally, in some embodiments, the maximum chord 312/334 (i.e., a maximum length of a chord of the blade 300/322 extending from the leading edge 306/328 to the trailing edge 308/330) for the blade 300/322 is defined or radially located at or greater than sixty percent (60%) of the span of the blade 300/322.

Figure 6:
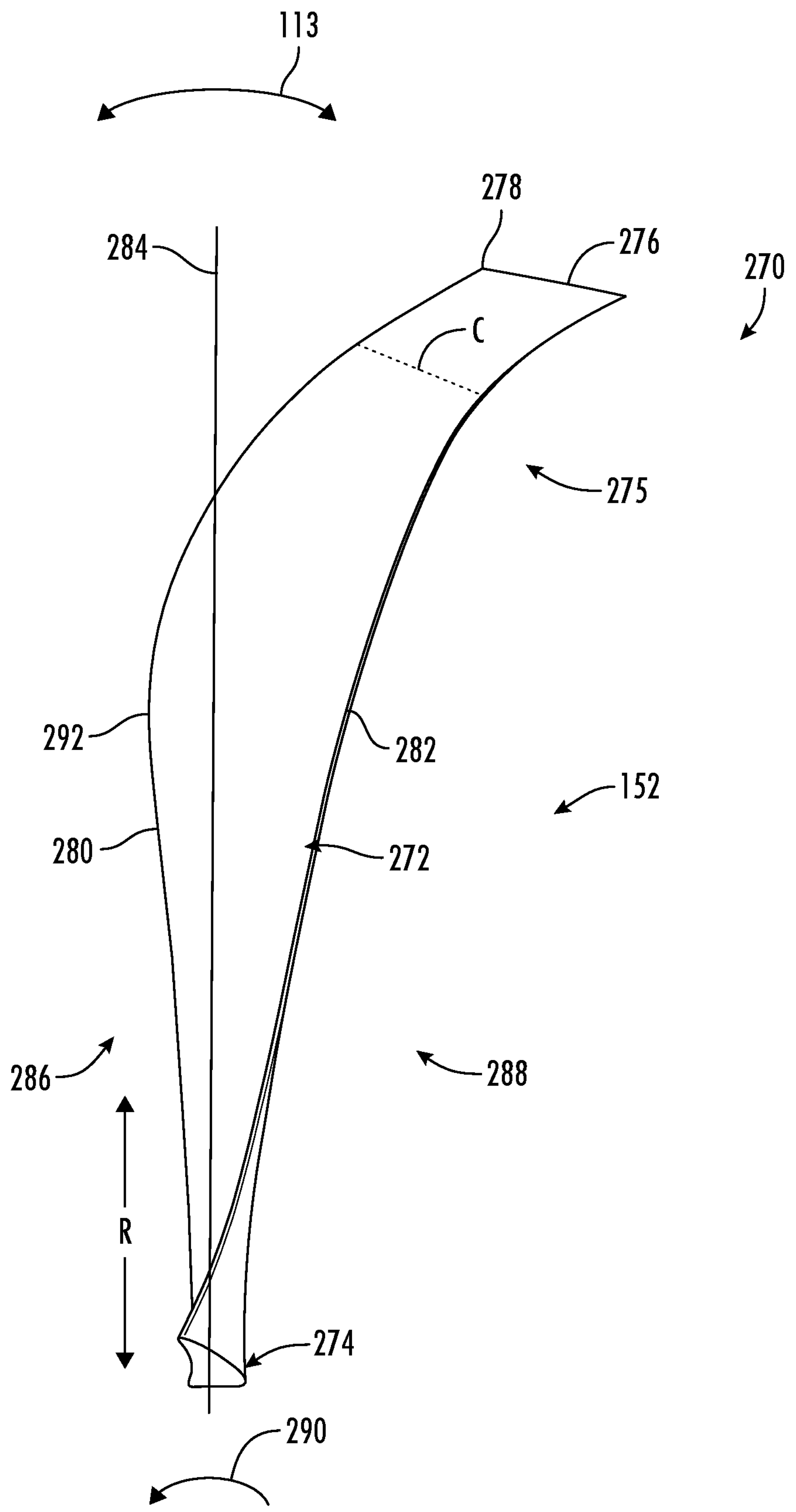
FIG. 6 is a schematic view of an exemplary airfoil according to various embodiments of the present disclosure.

Referring to FIG. 6, FIG. 6 is a schematic view of an exemplary airfoil or blade 272 of an unducted airfoil assembly 270 according to an embodiment of the present disclosure. In some embodiments, blade 272 may be configured similarly to the blade 214 (FIGS. 2 and 3), the blade 300 (FIGS. 4A and 4B), or the blade 322 (FIGS. 5A and 5B). In FIG. 6, the blade 272 is viewed from the aft direction looking in the forward direction. The exemplary unducted airfoil assembly 270 may be configured for use as the fan 152 or the fan guide vane array 160 of FIG. 1. The unducted airfoil assembly 270 includes an array of the blades 272 (only one shown in FIG. 6) that are regularly spaced apart circumferentially (e.g., in the circumferential direction 113 (FIG. 1)) around a disk or hub of a rotor centered on the longitudinal axis 112 (FIG. 1) of the fan 152 (FIG. 1). Each blade 272 includes a leading edge 280, a trailing edge 282, a root or proximal end 274 (i.e., an inboard end in the radial direction R toward the longitudinal axis 112 (FIG. 1)) and a tip portion 275 defining a tip 276 and a tip leading edge 278 (defined at an intersection of the tip 276 with the leading edge 280) such that a span or spanwise direction of the blade 272 is defined between the root 274 and the tip 276. As indicated above, the "tip portion" 275 is defined as a portion of the blade 272 extending radially from the radial location of a forward-most axial point of the leading edge 280 of the blade 272 to the radial location of the tip leading edge 278 of the blade 272 when the blade 272 is at its design orientation (e.g., at an orientation representative of subsonic cruise operation). The blade 272 forms an aerodynamic surface extending along the axial direction between the leading edge 280 and the trailing edge 282. Each fan blade 272 defines a central blade axis 284. In some embodiments, each fan blade 272 is pitchable about its central blade axis 284.

In the illustrated embodiment, the blade 272 includes a pressure side 286 and a circumferentially or laterally opposite suction side 288. The pressure side 286 is generally concave and precedes the generally convex suction side 288 as the blade 272 rotates in a rotational direction 290. In one aspect of the present disclosure, the blade 272 includes certain geometries having specific circumferential lean and axial sweep features for the leading edge 280, the trailing edge 282, and the tip leading edge 278 at its design orientation (e.g., at an orientation representative of subsonic cruise operation). For example, in the embodiment illustrated in FIG. 6, the blade 272 includes a forward-most axial point 292 on the leading edge 280. In the illustrated embodiment, a circumferential coordinate of the tip leading edge 278 is located in a direction opposite a direction of rotation of the blade 272 (e.g., a direction opposite the rotational direction 290) with respect to a circumferential coordinate of the forward-most axial point 292. Additionally, as illustrated in FIG. 6, circumferential coordinates of the leading edge 280 and the trailing edge 282 of the tip portion 275 lean in a direction opposite a direction of rotation of the blade 272 (e.g., a direction opposite the rotational direction 290). In other words, the tip portion 275 leans toward the suction side

288 of the blade 272. Thus, in exemplary embodiments, the entire tip portion 275 leans in a direction opposite the rotational direction 290. Thus, in exemplary embodiments, the tip leading edge 278 is circumferentially offset in a direction opposite the rotational direction 290 relative to a circumferential coordinate of the forward-most axial point 292.

Additionally, in some embodiments, a fractional chord location (or a chordwise fractional distance) of a maximum thickness of the blade 272 relative to the leading edge 280 for a chordwise section of the blade 272 is furthest forward in the tip portion 275 of the blade 272. As used herein, "furthest forward" refers to a fractional distance of an axial chord for the maximum thickness location from the leading edge 280 at a given radial location and chordwise section of the blade 272. In some embodiments, a maximum thickness of the blade 272 in the tip portion 275 for a chord C extending from the leading edge 280 to the trailing edge 282 is located between five percent to forty percent of the chord C (between 0.05 to 0.40 chord fraction) relative to the leading edge 280. In some embodiments, a maximum thickness of the blade 272 in the tip portion 275 for a chord C extending from the leading edge 280 to the trailing edge 282 is located between five percent to thirty percent of the chord C (between 0.05 to 0.30 chord fraction) relative to the leading edge 280. In some embodiments, a maximum thickness of the blade 272 in the tip portion 275 for a chord C extending from the leading edge 280 to the trailing edge 282 is located between five percent to twenty-five percent of the chord C (between 0.05 to 0.25 chord fraction) relative to the leading edge 280. In some embodiments, a maximum thickness of the blade 272 in the tip portion 275 for a chord C extending from the leading edge 280 to the trailing edge 282 is located between five percent to twenty percent of the chord C (between 0.05 to 0.20 chord fraction) relative to the leading edge 280. In some embodiments, a maximum thickness of the blade 272 in the tip portion 275 for a chord C extending from the leading edge 280 to the trailing edge 282 is located between the leading edge 280 and forty percent of the chord C (0.40 chord fraction) relative to the leading edge 280. In some embodiments, a maximum thickness of the blade 272 in the tip portion 275 for a chord C extending from the leading edge 280 to the trailing edge 282 is located between the leading edge 280 and thirty percent of the chord C (0.30 chord fraction) relative to the leading edge 280. In some embodiments, a maximum thickness of the blade 272 in the tip portion 275 for a chord C extending from the leading edge 280 to the trailing edge 282 is located between the leading edge 280 and twenty-five percent of the chord C (0.25 chord fraction) relative to the leading edge 280. In some embodiments, a maximum thickness of the blade 272 in the tip portion 275 for a chord C extending from the leading edge 280 to the trailing edge 282 is located between the leading edge 280 and twenty percent of the chord C (0.20 chord fraction) relative to the leading edge 280. Thus, in exemplary embodiments, the chordwise fractional distance from the leading edge 280 of a maximum thickness of the blade 272 for a chordwise section of the blade 272 is minimum in the tip portion 275.

Further, in some embodiments of the present disclosure, circumferential coordinates of the leading edge 280 in a radial direction monotonically increase relative to a circumferential coordinate of the forward-most axial point 292 of the leading edge 280 in a direction away from a rotation of a rotor assembly (e.g., rotor assembly 150 (FIG. 1)) containing the blade 272 (e.g., in a direction away or opposite the rotational direction 290) beyond certain $R/R_{tip}$ values. For example, in some embodiments, circumferential coordinates of the leading edge 280 in a radial direction monotonically increase relative to a circumferential coordinate of the forward-most axial point 292 in a direction away from a rotation of a rotor assembly (e.g., rotor assembly 150 (FIG. 1)) containing the blade 272 (e.g., in a direction away or opposite the rotational direction 290) at or beyond an $R/R_{tip}$ value of 0.6. In some embodiments, circumferential coordinates of the leading edge 280 in a radial direction monotonically increase relative to a circumferential coordinate of the forward-most axial point 292 in a direction away from a rotation of a rotor assembly (e.g., rotor assembly 150 (FIG. 1)) containing the blade 272 (e.g., in a direction away or opposite the rotational direction 290) at or beyond an $R/R_{tip}$ value of 0.65. In some embodiments, circumferential coordinates of the leading edge 280 in a radial direction monotonically increase relative to a circumferential coordinate of the forward-most axial point 292 in a direction away from a rotation of a rotor assembly (e.g., rotor assembly 150 (FIG. 1)) containing the blade 272 (e.g., in a direction away or opposite the rotational direction 290) at or beyond an $R/R_{tip}$ value of 0.68. In some embodiments, circumferential coordinates of the leading edge 280 in a radial direction monotonically increase relative to a circumferential coordinate of the forward-most axial point 292 in a direction away from a rotation of a rotor assembly (e.g., rotor assembly 150 (FIG. 1)) containing the blade 272 (e.g., in a direction away or opposite the rotational direction 290) at or beyond an $R/R_{tip}$ value of 0.72. It should also be understood that in exemplary embodiments where the blade 272 comprises a guide vane (e.g., the fan guide vane 162), the lean of the blade 272 will be in the direction of rotation.

Figure 7:
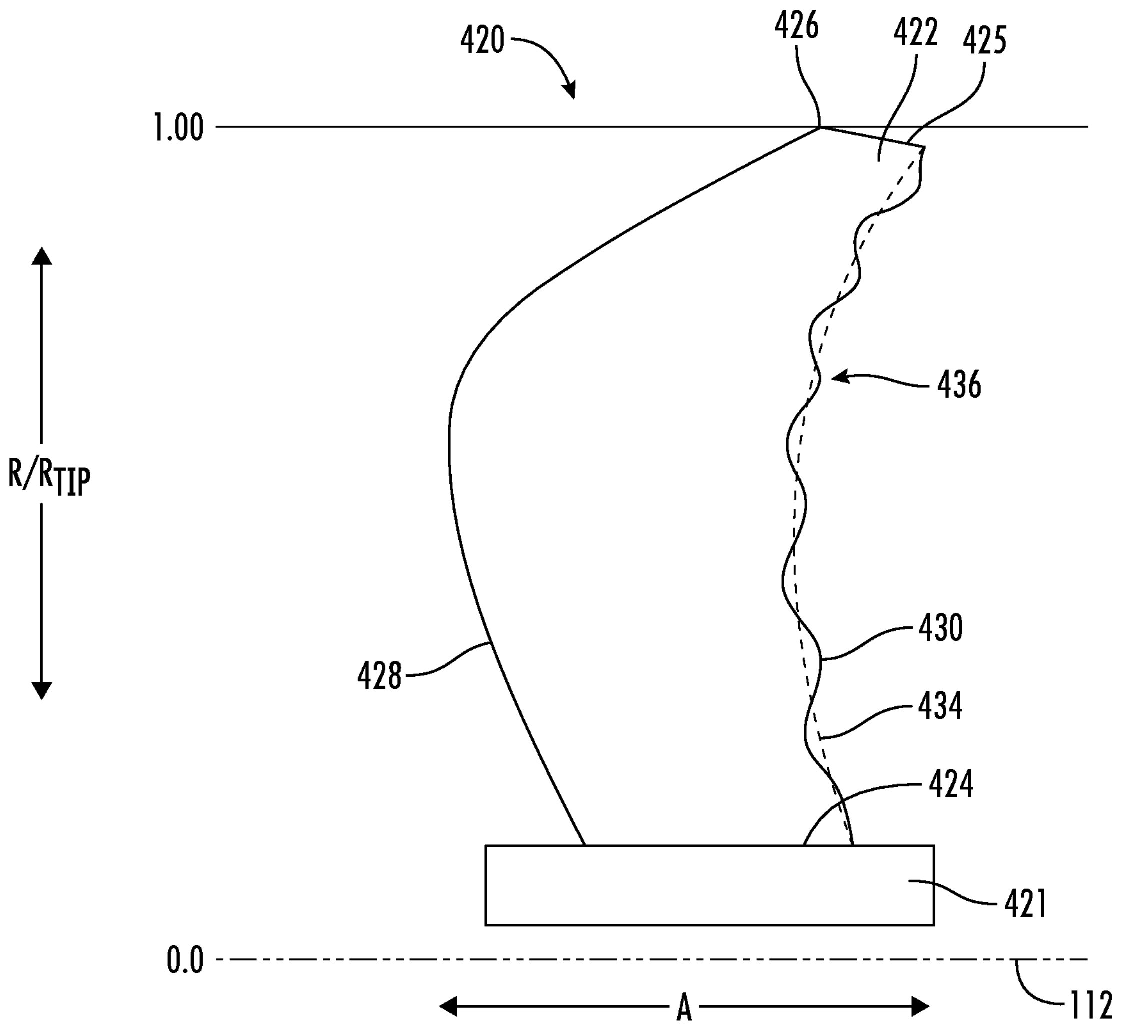
FIG. 7 is a schematic view of an exemplary airfoil according to another embodiment of the present disclosure.

Referring to FIG. 7, FIG. 7 is a schematic view of an exemplary airfoil or blade 422 of an unducted airfoil assembly 420 according to another embodiment of the present disclosure. The blade 422 may be configured similarly to the blade 214 (FIGS. 2 and 3), the blade 300 (FIGS. 4A and 4B), the blade 322 (FIGS. 5A and 5B), or the blade 272 (FIG. 6). The blade 422 may be configured for use as the fan 152 or the fan guide vane array 160 of the engine 100 as depicted in FIG. 1. For example, an array or plurality of the blades 422 (only one shown in FIG. 7) may be regularly spaced apart circumferentially around a disk or hub 421 of a rotor centered on the longitudinal axis 112 of the fan 152 (FIG. 1).

In the illustrated embodiment, the blade 422 includes a sculpted trailing edge feature 436. For example, in the illustrated embodiment, blade 422 includes a leading edge 428, a trailing edge 430, a root or proximal end 424 (i.e., an inboard end in the radial direction toward the longitudinal axis 112 (FIG. 1)) and a tip 425. Also, an intersection of the tip 425 and the leading edge 428 is defined as a tip leading edge 426 such that a span or spanwise direction of the blade 422 is defined between the root 424 and the tip 425. Blade 422 forms an aerodynamic surface extending along the axial direction A between the leading edge 428 and the trailing edge 430. In the illustrated embodiment, the blade 422 includes at its trailing edge 430 the sculpted trailing edge feature 436 (e.g., a wavy feature or plurality of features) configured to facilitate wake mixing to reduce interaction noise caused by the blade 422 wakes impinging on downstream stationary airfoils or stators (or stator vanes), as described in U.S. Pat. No. 8,083,487 B2 which is hereby incorporated by reference in its entirety. A baseline 434 trailing edge having a smooth profile is depicted to further illustrate the sculpted trailing edge feature 436. Alternatively or additionally, the sculpted trailing edge feature 436 may be applied on the fan guide vanes 162 of the engine 100 (FIG.

1) to reduce the broadband noise generated by the turbulence in the stator vane boundary layer convecting past its trailing edge.

Thus, embodiments of the present disclosure include circumferentially spaced airfoils or blades where the blades include a leading edge and a trailing edge, and further defining a root and a tip extending radially to define a span of the airfoil. Embodiments of the present disclosure increase the lean and axial sweep of the blade near the tip of the blade to reduce noise radiated by the blade. Embodiments of the present disclosure reduce noise at cruise and LTO flight conditions while minimizing weight and mechanical complexity by localizing sweep in the acoustically sensitive portions of the blade by tailoring the chord and axial position of the leading edge of the blade. For example, in some embodiments, a forward-most axial point of the leading edge is located at or between sixty percent and seventy-five percent of a tip radius of the airfoil. Additionally, in some embodiments, a maximum chord extending from the leading edge to the trailing edge is located at or between sixty percent and seventy-five percent of a tip radius of the blade.

As will be appreciated from the description herein, various embodiments of a gas turbine engine are provided. Certain of these embodiments may be an unducted, single rotor gas turbine engine, or a ducted turbofan engine. An example of a ducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 1, described extensively throughout the application)). Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least about 300 degrees, such as at least about 330 degrees).

In one or more of these embodiments, a threshold power or disk loading for a fan (e.g., an unducted single rotor or primary forward fan) may range from 25 horsepower per square foot (hp/ft2) or greater at cruise altitude during a cruise operating mode. In particular embodiments of the engine, structures and methods provided herein generate power loading between 80 hp/ft2 and 160 hp/ft2 or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature. In some exemplary embodiments, the fan may have an aerodynamic loading distribution to maximize cruise efficiency as described in U.S. Pat. No. 10,202,865 B2 which is hereby incorporated by reference in its entirety.

As such, it will be appreciated that an engine of such a configuration may be configured to generate at least about 20,000 pounds and less than about 80,000 of thrust during operation at a rated speed, such as between about 20,000 and 50,000 pounds of thrust during operation at a rated speed, such as between about 20,000 and 40,000 pounds of thrust during operation at a rated speed.

In various exemplary embodiments, the fan may include twelve (12) fan blades. From a loading standpoint, such a blade count may allow a span of each blade to be reduced such that the overall diameter of the primary fan may also be reduced (e.g., to about twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of blades to a quantity of vanes that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of blades to a quantity of vanes between 2:5 and 2:1, or between 2:4 and 3:2, or between 0.5 and 1.5. The ratio may be tuned based on a variety of factors including a size of the vanes to ensure a desired amount of swirl is removed for an airflow from the primary fan. In various embodiments, the quantity of blades is twenty (20) or fewer. In still certain embodiments, a sum of the quantity of blades and the quantity of vanes is between twenty (20) and thirty (30), or between twenty-four (24) and twenty-eight (28), or between twenty-five (25) and twenty-seven (27). In one embodiment, the engine includes a quantity of blades between eleven (11) and sixteen (16). In another embodiment, the engine includes twelve (12) blades and ten (10) vanes. In still another embodiment, the engine includes between three (3) and twenty (20) blades and between three (3) and twenty (20) vanes. In yet another embodiment, the engine includes an equal quantity of blades and vanes. In still yet another embodiment, the engine includes an equal quantity of blades and vanes, in which the quantity of blades is equal to or fewer than twenty (20). In various embodiments, the engine includes a combination of the quantity of blades to the quantity of vanes between 2:5 and 2:1, the difference between the quantity of blades and the quantity of vanes between two (2) and negative two (−2), and the quantity of blades between eleven (11) and sixteen (16). For example, a difference between the quantity of blades and the quantity of vanes may correspond to an engine having fourteen (14) blades and sixteen (16) vanes, or fourteen (14) blades and twelve (12) vanes, or sixteen (16) blades and eighteen (18) vanes, or sixteen (16) blades and fourteen (14) vanes, or eleven (11) blades and thirteen (13) vanes, or eleven (11) blades and nine (9) vanes, etc.

Additionally, in certain exemplary embodiments, where the engine includes the third stream and a mid-fan (a ducted fan aft of the primary, forward fan), a ratio R1/R2 may be between about 1 and 10, or 2 and 7, or at least about 3.3, at least about 3.5, at least about 4 and less than or equal to about 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 600 to 900 fps, or 700 to 800 fps.

A fan pressure ratio (FPR) for the fan of the fan assembly can be 1.04 to 1.20, or in some embodiments 1.05 to 1.1, or in some embodiments less than 1.08, as measured across the fan blades at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0. As such, in some embodiments, the fan can be configured to rotate at a rotational speed of 700 to 1500 rpm at a cruise flight condition, while the power turbine (e.g., the low-pressure turbine) is configured to rotate at a rotational speed of 2,500 to 15,000 rpm at a cruise flight condition. In particular embodiments, the fan can be configured to rotate at a rotational speed of 850 to 1,350 rpm at a cruise flight condition, while the power turbine is configured to rotate at a rotational speed of 5,000 to 10,000 rpm at a cruise flight condition.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 8 to 15 stages, a high-pressure turbine may include 1 to 2 stages, and/or a low pressure turbine (LPT) may include 3 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced drag may provide for cruise altitude engine and aircraft operation at the above describe Mach numbers at cruise altitude. Still particular embodiments may provide such benefits with reduced interaction noise between the blade assembly and the vane assembly.

Additionally, it should be appreciated that ranges of power loading and/or rotor blade tip speed may correspond to certain structures, core sizes, thrust outputs, etc., or other structures at the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

Further aspects are provided by the subject matter of the following clauses:

An unducted airfoil assembly for a turbomachine, the airfoil assembly comprising: an airfoil defining a leading edge, a trailing edge, a root, and a tip; and wherein a forward-most axial point of the leading edge is radially located at or greater than sixty percent of a tip radius of the airfoil when the airfoil is oriented at a design orientation for subsonic cruise operation.

The unducted airfoil assembly of any preceding clause, wherein the airfoil comprises a tip portion extending radially from the forward-most axial point to the tip, and wherein a maximum thickness of the airfoil in the tip portion for a chord extending from the leading edge to the trailing edge is located between five percent to thirty percent of the chord relative to the leading edge.

The unducted airfoil assembly of any preceding clause, wherein the maximum thickness of the airfoil in the tip portion for the chord extending from the leading edge to the trailing edge is located between five percent (5%) to twenty-five percent (25%) of the chord relative to the leading edge.

The unducted airfoil assembly of any preceding clause, wherein the maximum thickness of the airfoil in the tip portion for the chord extending from the leading edge to the trailing edge is located between five percent (5%) to twenty percent (20%) of the chord relative to the leading edge.

The unducted airfoil assembly of any preceding clause, wherein the maximum thickness of the airfoil in the tip portion for the chord extending from the leading edge to the trailing edge is located between five percent (5%) to forty percent (40%) of the chord relative to the leading edge.

The unducted airfoil assembly of any preceding clause, wherein the maximum thickness of the airfoil in the tip portion for the chord extending from the leading edge to the trailing edge is located between the leading edge and forty percent (40%) of the chord relative to the leading edge.

The unducted airfoil assembly of any preceding clause, wherein the maximum thickness of the airfoil in the tip portion for the chord extending from the leading edge to the trailing edge is located between the leading edge and thirty percent (30%) of the chord relative to the leading edge.

The unducted airfoil assembly of any preceding clause, wherein the maximum thickness of the airfoil in the tip portion for the chord extending from the leading edge to the trailing edge is located between the leading edge and twenty-five (25%) percent of the chord relative to the leading edge.

The unducted airfoil assembly of any preceding clause, wherein the maximum thickness of the airfoil in the tip portion for the chord extending from the leading edge to the trailing edge is located between the leading edge and twenty percent (20%) of the chord relative to the leading edge.

The unducted airfoil assembly of any preceding clause, wherein the radial location of the forward-most axial point of the leading edge is located at or greater than seventy-two percent (72%) of the tip radius.

The unducted airfoil assembly of any preceding clause, wherein the radial location of the forward-most axial point of the leading edge is located at or greater than seventy-five percent (75%) of the tip radius.

The unducted airfoil assembly of any preceding clause, wherein the radial location of the forward-most axial point of the leading edge is located at or greater than seventy-two percent (72%) of the tip radius.

The unducted airfoil assembly of any preceding clause, wherein the radial location of the forward-most axial point of the leading edge is located at or greater than sixty-eight percent (68%) of the tip radius.

The unducted airfoil assembly of any preceding clause, wherein the radial location of the forward-most axial point of the leading edge is located at or greater than sixty-five percent (65%) of the tip radius.

The unducted airfoil assembly of any preceding clause, wherein a maximum chord extending from the leading edge to the trailing edge is located at or greater than sixty-eight percent (68%) of the tip radius.

The unducted airfoil assembly of any preceding clause, wherein a maximum chord extending from the leading edge to the trailing edge is located at or greater than sixty-five percent (65%) of the tip radius.

The unducted airfoil assembly of any preceding clause, wherein a maximum chord extending from the leading edge to the trailing edge is located at or greater than sixty percent (60%) of the tip radius.

The unducted airfoil assembly of any preceding clause, wherein a maximum chord extending from the leading edge to the trailing edge is located at or greater than seventy-two percent (72%) of the tip radius.

The unducted airfoil assembly of any preceding clause, wherein a maximum chord extending from the leading edge to the trailing edge is located at or greater than seventy-five percent (75%) of the tip radius.

The unducted airfoil assembly of any preceding clause, wherein the trailing edge comprises a sculpted trailing edge feature.

The unducted airfoil assembly of any preceding clause, wherein the airfoil is arranged around a longitudinal axis and rotates about the longitudinal axis in a rotational direction, and wherein a tip leading edge of the airfoil is circumferentially offset in a direction opposite the rotational direction relative to a circumferential location of the forward-most axial point.

The unducted airfoil assembly of any preceding clause, wherein a chordwise fractional distance from the leading edge of a maximum thickness of an airfoil section of the airfoil is minimum in a tip portion of the airfoil.

The unducted airfoil assembly of any preceding clause, wherein a fractional chord location of a maximum thickness of the airfoil is located furthest forward relative to the leading edge in the tip portion.

The unducted airfoil assembly of any preceding clause, wherein the airfoil is a guide vane.

The unducted airfoil assembly of any preceding clause, wherein the airfoil is arranged around a longitudinal axis and rotates about the longitudinal axis in a rotational direction, and wherein the airfoil includes a tip portion, and wherein the leading edge in the tip portion leans in a direction opposite the rotational direction.

The unducted airfoil assembly of any preceding clause, wherein the airfoil is arranged around a longitudinal axis and rotates about the longitudinal axis in a rotational direction, and wherein the airfoil includes a tip portion, and wherein a circumferential coordinate of the leading edge in the tip portion leans in a direction opposite the rotational direction.

The unducted airfoil assembly of any preceding clause, wherein the airfoil is arranged around a longitudinal axis and rotates about the longitudinal axis in a rotational direction, and wherein the airfoil comprises a tip portion, and wherein the tip portion leans in a direction opposite the rotational direction.

The unducted airfoil assembly of any preceding clause, wherein circumferential coordinates of the leading edge in a radial direction monotonically increase relative to a circumferential coordinate of the forward-most axial point of the leading edge in a direction away from a rotational direction of the airfoil at or beyond an $R/R_{tip}$ value of 0.6.

The unducted airfoil assembly of any preceding clause, wherein circumferential coordinates of the leading edge in a radial direction monotonically increase relative to a circumferential coordinate of the forward-most axial point of the leading edge in a direction away from a rotational direction of the airfoil at or beyond an $R/R_{tip}$ value of 0.65.

The unducted airfoil assembly of any preceding clause, wherein circumferential coordinates of the leading edge in a radial direction monotonically increase relative to a circumferential coordinate of the forward-most axial point of the leading edge in a direction away from a rotational direction of the airfoil at or beyond an $R/R_{tip}$ value of 0.68.

The unducted airfoil assembly of any preceding clause, wherein circumferential coordinates of the leading edge in a radial direction monotonically increase relative to a circumferential coordinate of the forward-most axial point of the leading edge in a direction away from a rotational direction of the airfoil at or beyond an $R/R_{tip}$ value of 0.72.

The unducted airfoil assembly of any preceding clause, wherein, in a tip portion of the airfoil, circumferential coordinates of the leading edge increase monotonically in a direction away from the rotational direction of the airfoil, as a radial distance increases.

An unducted airfoil assembly for a gas turbine engine, the airfoil assembly comprising: an airfoil defining a leading edge and a trailing edge, and further defining a root and a tip; and at least one of a radial location of a forward-most axial point of the leading edge when the airfoil is oriented at a design orientation for subsonic cruise operation or a maximum chord extending from the leading edge to the trailing edge is located at or greater than sixty-five percent (65%) of a tip radius of the airfoil.

An unducted airfoil assembly for a gas turbine engine, the airfoil assembly comprising: an airfoil defining a leading edge and a trailing edge, and extending in span from a root to a tip; and wherein a radial location of a forward-most axial point of the leading edge is located at or greater than fifty percent (50%) of the span of the airfoil when the airfoil is oriented at a design orientation for subsonic cruise operation.

An unducted airfoil assembly for a gas turbine engine, the airfoil assembly comprising: an airfoil defining a leading edge and a trailing edge, and extending in span from a root to a tip; wherein a radial location of a forward-most axial point of the leading edge is located at or greater than fifty-five percent (55%) of the span of the airfoil when the airfoil is oriented at the design orientation for subsonic cruise operation.

An unducted airfoil assembly for a gas turbine engine, the airfoil assembly comprising: an airfoil defining a leading edge and a trailing edge, and extending in span from a root to a tip; wherein a radial location of a forward-most axial point of the leading edge is located at or greater than sixty percent (60%) of the span of the blade when the blade is oriented at the design orientation for subsonic cruise operation.

An unducted airfoil assembly for a gas turbine engine, the airfoil assembly comprising: an airfoil defining a leading edge and a trailing edge, and extending in span from a root to a tip, wherein a maximum chord extending from the leading edge to the trailing edge is located at or greater than fifty percent (50%) of the span of the airfoil.

An unducted airfoil assembly for a gas turbine engine, the airfoil assembly comprising: an airfoil defining a leading edge and a trailing edge, and extending in span from a root to a tip, wherein a maximum chord extending from the leading edge to the trailing edge is located at or greater than fifty-five percent (55%) of the span of the airfoil.

An unducted airfoil assembly for a gas turbine engine, the airfoil assembly comprising: an airfoil defining a leading edge and a trailing edge, and extending in span from a root to a tip, wherein a maximum chord extending from the leading edge to the trailing edge is located at or greater than sixty percent (60%) of the span of the airfoil.

What is claimed is:

1. An unducted airfoil assembly, comprising:

an airfoil defining a leading edge and a trailing edge, a root and a tip;

wherein a forward-most axial point of the leading edge is radially located between sixty percent and seventy-five percent of a tip radius of the airfoil when the airfoil is oriented at a design orientation for subsonic cruise operation, wherein the forward-most axial point of the leading edge is arcuate, wherein the forward-most axial point of the leading edge is unducted, wherein the unducted airfoil assembly is configured to generate a power loading between 80 hp/ft2 and 160 hp/ft2 at a cruise altitude during a cruise operating mode, wherein a maximum chord extending from the leading edge to the trailing edge is located at or greater than seventy-five percent of the tip radius, and wherein the maximum chord is configured to localize sweep in an acoustically sensitive portion of the airfoil.

2. The unducted airfoil assembly of claim 1, wherein the airfoil comprises a tip portion extending radially from the forward-most axial point to the tip, and wherein a maximum thickness of the airfoil in the tip portion for a chord extending from the leading edge to the trailing edge is located between five percent to thirty percent of the chord relative to the leading edge.

3. The unducted airfoil assembly of claim 1, wherein the subsonic cruise operation is a subsonic cruise flight speed at or above a flight Mach number of 0.5.

4. The unducted airfoil assembly of claim 1, wherein the airfoil is arranged around a longitudinal axis and rotates about the longitudinal axis in a rotational direction, and wherein a tip leading edge of the airfoil is circumferentially offset in a direction opposite the rotational direction relative to a circumferential location of the forward-most axial point.

5. The unducted airfoil assembly of claim 1, wherein a chordwise fractional distance from the leading edge of a maximum thickness of an airfoil section of the airfoil is minimum in a tip portion of the airfoil.

6. The unducted airfoil assembly of claim 1, wherein circumferential coordinates of the leading edge in a radial direction monotonically increase relative to a circumferential coordinate of the forward-most axial point of the leading edge in a direction away from a rotational direction of the airfoil at or beyond sixty percent of the tip radius of the airfoil.

7. The unducted airfoil assembly of claim 1, further comprising a hub defining an outer radius, wherein the airfoil extends radially outward from the hub, and wherein the outer radius of the hub is located radially at thirty percent of the tip radius of the airfoil.

8. An unducted airfoil assembly, comprising:

an airfoil defining a leading edge and a trailing edge, and further defining a root and a tip, wherein the airfoil is oriented at a design orientation for subsonic cruise operation; and a maximum chord extending from the leading edge to the trailing edge is located at or greater than seventy-five percent of a tip radius of the airfoil, wherein the unducted airfoil assembly is configured to generate a power loading between 80 hp/ft2 and 160 hp/ft2 at a cruise altitude during a cruise operating mode, wherein the maximum chord is configured to localize sweep in an acoustically sensitive portion of the airfoil, wherein a forward-most axial point of the leading edge is arcuate, wherein the forward-most axial point of the leading edge is unducted.

9. The unducted airfoil assembly of claim 8, wherein the airfoil defines the forward-most axial point of the leading edge and a tip portion extending from a radial location of the forward-most axial point of the leading edge to a radial location of the tip, and wherein a maximum thickness of the airfoil along a chord in the tip portion is located between five percent to thirty percent of the chord relative to the leading edge.

10. The unducted airfoil assembly of claim 9, wherein a chordwise fractional distance from the leading edge of a maximum thickness of an airfoil section of the airfoil is minimum in a tip portion of the airfoil.

11. The unducted airfoil assembly of claim 9, wherein the airfoil is arranged around a longitudinal axis and rotates about the longitudinal axis in a rotational direction, and wherein a tip leading edge of the airfoil is circumferentially offset in a direction opposite the rotational direction relative to a circumferential location of the forward-most axial point.

12. The unducted airfoil assembly of claim 8, further comprising a hub defining an outer radius, wherein the airfoil extends radially outward from the hub, and wherein the outer radius of the hub is located radially at thirty percent of the tip radius of the airfoil.

* * * * *